(12) United States Patent
Mohindra et al.

(10) Patent No.: US 6,721,548 B1
(45) Date of Patent: Apr. 13, 2004

(54) HIGH DYNAMIC RANGE LOW RIPPLE RSSI FOR ZERO-IF OR LOW-IF RECEIVERS

(75) Inventors: Rishi Mohindra, Milpitas, CA (US); Petrus M. Stroet, Sunnyvale, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/469,330

(22) Filed: Dec. 22, 1999

(51) Int. Cl.[7] ............................ H04B 17/00; H04B 1/16
(52) U.S. Cl. ............................ 455/234.1; 455/250.1; 455/313; 455/226.1; 375/322; 327/354
(58) Field of Search ...................... 455/234.1, 250.1, 455/226.1, 226.2, 227, 324, 269, 273, 323, 313; 327/354, 355, 356, 357, 361; 375/322, 324

(56) References Cited

U.S. PATENT DOCUMENTS

| | | | |
|---|---|---|---|
| 5,338,985 A | | 8/1994 | Fotowat-Ahmady et al. .... 307/494 |
| 5,603,112 A | * | 2/1997 | Gabato et al. ............ 455/226.2 |
| 5,901,347 A | * | 5/1999 | Chambers et al. ........ 455/234.1 |
| 5,978,664 A | | 11/1999 | Janssen .................... 455/266.2 |
| 6,081,697 A | * | 6/2000 | Haartsen .................... 455/109 |
| 6,311,049 B1 | * | 10/2001 | Yoshizawa ............... 455/226.2 |

OTHER PUBLICATIONS

Draft Supplement IEEE 802.11B STD, 1997, p. 62.

* cited by examiner

*Primary Examiner*—Sinh Tran
*Assistant Examiner*—Kamran Afshar
(74) *Attorney, Agent, or Firm*—Aaron Waxler

(57) ABSTRACT

A received signal strength indicator operating at low intermediate of zero intermediate frequency is provided. The received signal strength indicator forms absolute values from an in-phase signal component and a quadrature signal component of a low or zero intermediate frequency signal that represents a received radio frequency signal. The absolute values are added. Logarithmic signal processing is performed either before absolute signal forming or after adding. Finally, low pass filtering is performed.

11 Claims, 3 Drawing Sheets

HIGH DYNAMIC RANGE LOW RIPPLE RSSI FOR ZERO-IF OR LOW-IF RECEIVERS

BACKGROUND OF THE INVENTION

1. Field of the Invention

The present invention relates to a received signal strength indicator for a zero intermediate frequency or a low intermediate frequency radio device such as a receiver or transceiver. Such a radio device receives radio frequency signals, and, when a transmit part is also present, also transmits signals. Such a radio device can be a cellular radio device, a cordless telephone, a wireless local area network radio device, a satellite radio device, or any other suitable radio device.

2. Description of the Related Art

In the U.S. Pat. No. 5,603,112, a received signal strength indicator is disclosed. The received signal strength indicator is used for performing signal strength measurements of received radio frequency signals in radio frequency receivers. The received signal strength indicator comprises analog to digital converters for sampling quadrature down modulated signals at an intermediate frequency. Output signals of the analog to digital converters are supplied to respective comparators that compare magnitudes of the quadrature intermediate frequency signals. Based on comparison results, the magnitudes of either the in-phase signal or quadrature signal is supplied to either a divide-by-16 divider, to a divide-by-8 divider, or by a divide-by-4 divider. The in-phase and quadrature signals, and the divided in-phase and quadrature signals are combined in a number of adders, of the adders providing the received signal strength indicator signal. Through such a comparison, division, and combining, a scaled combination of approximated magnitudes of in-phase and quadrature down converted quadrature signals is computed, approximating the magnitude of the received vector, the received vector being the square root of the sum of the squared magnitudes of the in-phase and quadrature down converted quadrature signals. Such a computation of an approximation of the magnitude of the received vector, used as a received signal strength indicator signal in the intermediate frequency domain, is complex.

In the U.S. Pat. No. 5,338,985, a received signal strength indicator for operation at intermediate frequencies is disclosed. The received signal strength indicator comprises a number of cascaded amplifiers that amplify an intermediate frequency signal. Output signals of the respective amplifiers are rectified, and, after voltage to current conversion, currents representing rectified signals are weightedly added so as to obtain a received signal strength indicator signal. From the last amplifier of the multistage amplifier to the first amplifier, the amplifiers successively run out of their linear region and get into their limiting or clipping range, with an increasing input signal amplitude. Herewith, the resulting received signal strength indicator signal approximates a linear function of the logarithm of the input intermediate frequency signal. The more amplifier stages in the cascade of amplifiers, the better the linear approximation is.

In the U.S. Pat. No. 5,978,664, peak detector is disclosed. The peak detector is particularly suitable for measuring the peak value of an RSSI signal formed by a multistage limiting and summing logarithmic amplifier. Reducing a ripple in a combination of a multistage limiting and summing logarithmic amplifier and detector, desirable to get a more reliable received signal strength indicator signal, renders the time response of the combination worse, i.e., the signal undesirably slowly decays after a sudden change in the amplitude of the highly dynamic radio signal to be measured.

On page 62 of the DRAFT Supplement, Part 11, of the IEEE 802.11b standard, operating channels are shown for North American Channel selection in the so-called 2.4 GHz ISM band.

SUMMARY OF THE INVENTION

It is an object of the invention to provide a received signal strength indicator signal at zero intermediate frequency or low intermediate frequency that is simple, that is low ripple, and that has a high dynamic range.

It is another object of the invention to provide a received signal strength indicator that produces a received signal strength indicator signal approximating a linear function of the logarithm of an input signal supplied to the received signal strength indicator.

It is still another object of the invention to provide a received signal strength indicator wherein for a particular modulation type of signals, such as QPSK, signal glitches are avoided.

In accordance with the invention, a method of determining a received signal strength indicator signal from an in-phase signal component and a quadrature signal component of a low intermediate frequency signal that represents a received radio frequency signal, is provided comprising:

determining a first absolute value from said in-phase signal component;

determining a second absolute value from said quadrature signal component; and said first and second absolute values.

The approximately linear function of the logarithm of the input signal is obtained by logarithmically processing of signals, either before or after determining the first and second absolute values.

Preferably, logarithmic processing is performed before determining the first and second absolute values, by a multistage limiter followed by an adder for adding signals produced by the limiter, in both the in-phase and quadrature signal path.

By low pass filtering the added absolute values, signal glitches are avoided.

BRIEF DESCRIPTION OF THE DRAWING

Throughout the figures the same reference numerals are used for the same features.

DESCRIPTION OF THE PREFERRED EMBODIMENT

Figure 1:
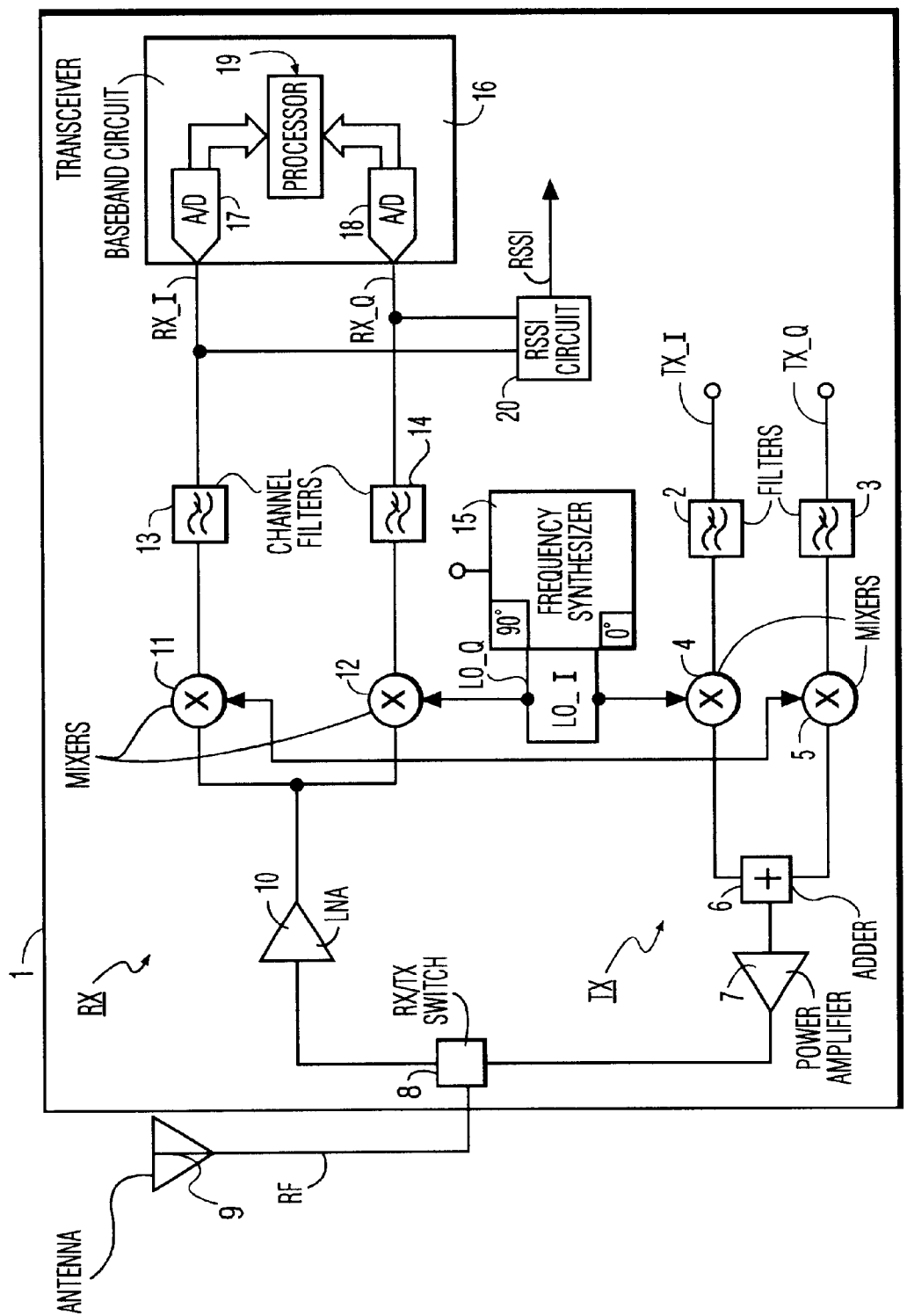
FIG. 1 schematically shows a block diagram of a transceiver with a received signal strength indicator according to the invention.

FIG. 1 shows a block diagram of a transceiver 1 as a zero intermediate frequency or low intermediate frequency radio device. Such a radio device can be a time division duplex radio device operating in the so-called 2.4 GHz ISM band, accordance with said IEEE 802.11b standard, or any other suitable radio device. The transceiver 1 comprises a receive branch Rx and a transmit branch Tx. In another embodiment in which no transmit branch Tx is present, the radio device is a receiver only. The transmit branch Tx comprises a quadrature mixer comprised of filters 2 and 3, mixers 4 and 5, and an adder 6. The adder 6 is coupled to a power amplifier 7. The power amplifier 7 is coupled to an Rx/Tx-switch 8. The Rx/Tx-switch 8 is coupled to an antenna 9. Quadrature transmit signals Tx_I and Tx_Q are generated by a modulator (not shown), and supplied to the filters 2 and 3, respectively. The receive branch Rx comprises a low noise radio frequency amplifier (LNA) 10 that is coupled to the Rx/Tx-switch 8. The LNA 10 amplifies a radio frequency signal RF that is received by the antenna 9. The receive branch Rx further comprises a quadrature down converter that comprises mixers 11 and 12 and channel filters 13 and 14. The transceiver 1 further comprises a frequency synthesizer 15 that generates quadrature local oscillator signals LO_I and LO_Q. The signal LO_I is supplied to the mixers 4 and 11. The signal LO_Q is supplied to the mixers 5 and 12. If the transceiver 1 is a zero intermediate frequency radio device operating in the ISM band, and receiving and transmitting in channel one of the ISM band, the frequency synthesizer 15 is tuned to 2.4 GHz. If the transceiver 1 is a low intermediate frequency radio device operating in the same band and channel, the frequency synthesizer is tuned to a slightly different frequency than 2.4 GHz. The transceiver 1 further comprises a base band circuit 16 with analog to digital converters 17 and 18 for processing down converted quadrature signals Rx_I and Rx_Q, and with a processor 19. The processor 19 comprises non-volatile memory (not shown) with a stored program, and volatile memory (not shown) for storing temporary data. The transceiver 1 further comprises a received signal strength indicator circuit 20 according to the invention that provides a recieved signal strength indicator signal RSSI. The signal RSSI is a high dynamic range low ripple signal, at zero-IF or at low IF that resolves the dynamic high range of the received radio frequency signal RF. In a radio device operating in the ISM band, the dynamic range typically is 80 dB. The signal RSSI can be used for controlling functions in the transceiver 1, or to provide signal strength information to a system in which the transceiver operates. The RSSI circuit 20 can be implemented in conventional digital hardware technology, or as a so-called ASIC (Application Specific Integrated Circuit), or as a programmed processor, or any other suitable implementation. In case the RSSI circuit 20 is implemented as a programmed processor, in addition to demodulating sampled signals Rx_I and Rx_Q, the processor performs a computational function to compute the signal RSSI. If needed for analog control function in the transceiver 1, a computed signal RSSI is supplied to a digital to analog converter.

Figure 2:
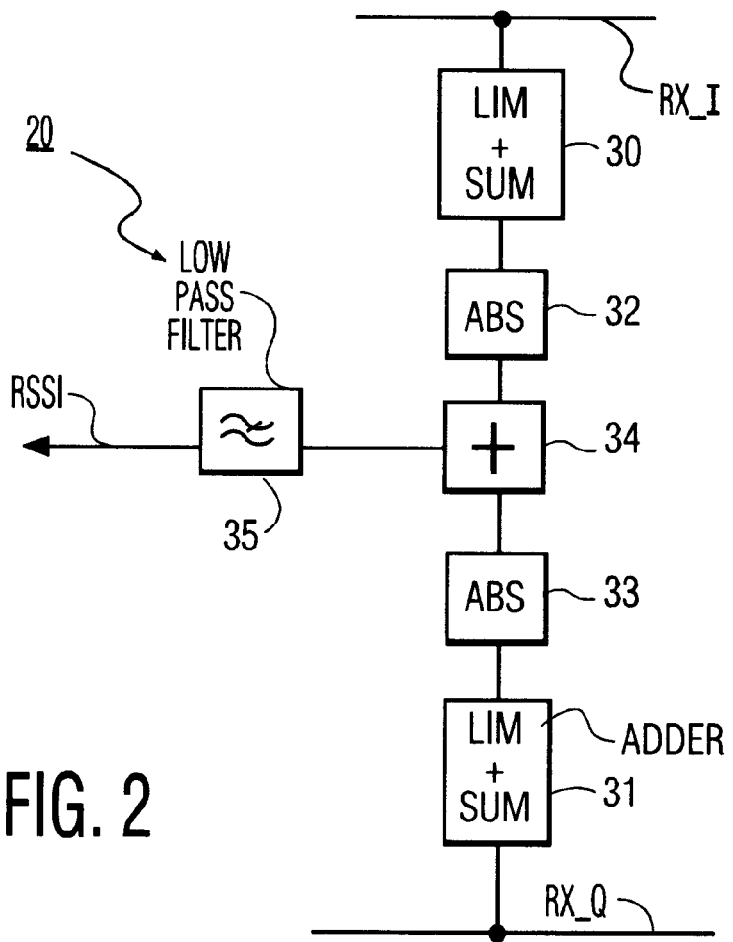
FIG. 2 shows a first embodiment of a received signal strength indicator according to the invention.

FIG. 2 shows a first embodiment of the received signal strength indicator (RSSI) 20 according to the invention. The RSSI 20 comprises a limiter and summer 30 to which the signal Rx_I is supplied, and a limiter and summer 31 to which the signal Rx_Q is supplied. Limited and summed signals are supplied to respective absolute signal formers 32 and 33. Absolute signals are added by an adder 34. Added absolute signals are low pass filtered by low pass filter 35. The low pass filter provides the RSSI signal.

Figure 3:
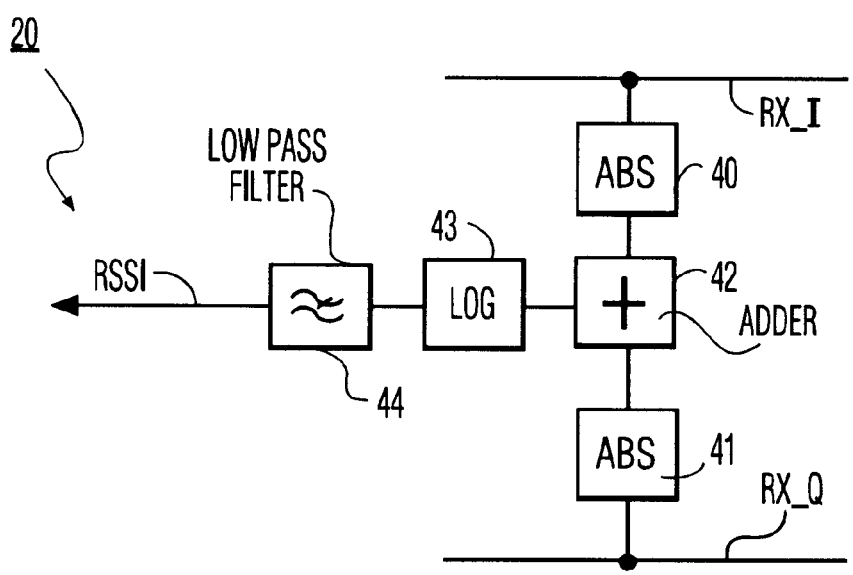
FIG. 3 shows a second embodiment of a received signal strength indicator according to the invention.

FIG. 3 shows a second embodiment of the received signal strength indicator 20 according to the invention. The RSSI 20 comprises absolute signal formers 40 and 41 to which the respective signals Rx_I and Rx_Q are supplied, and further an adder 42 for adding absolute signals. The adder 42 is coupled to a logarithmic signal former 43. The logarithmic signal former 43 is coupled a low pass filter 44 providing the RSSI signal.

Figure 4:
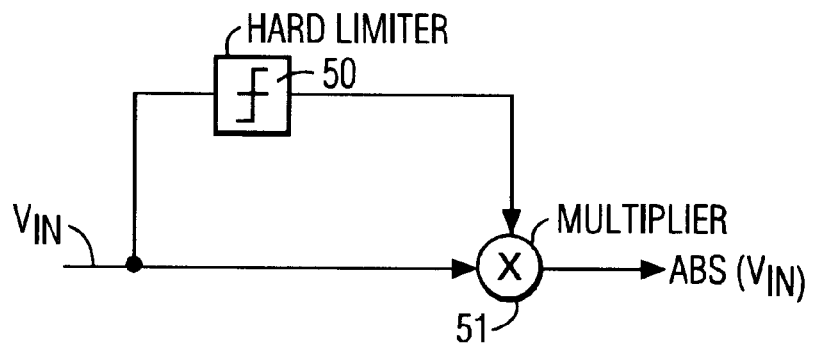
FIG. 4 shows an absolute signal former.

FIG. 4 shows an absolute signal former comprised of a hard limiter 50 and a multiplier 51. The hard limiter 50 can be a high gain amplifier. A signal $V_{IN}$ appears at the output as a signal ABS ($V_{IN}$)

Figure 5:
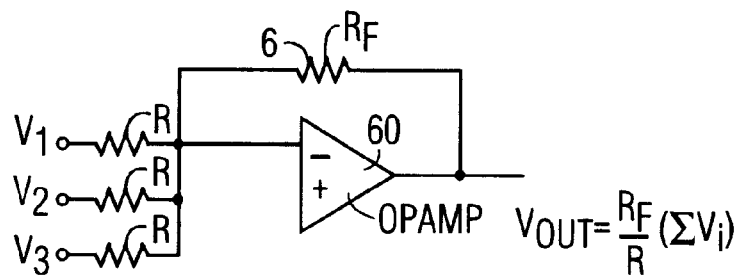
FIG. 5 shows an adder.

FIG. 5 shows an adder comprised of an operational amplifier 60 with resistors R to provide input signals $V_1$, $V_2$, and $V_3$ to the opamp 60, and a feedback resistor $R_f$. An output signal of the opamp is VOUT=$-R_f/R.(\Sigma V_i)$, i=1, 2, 3.

Figure 6:
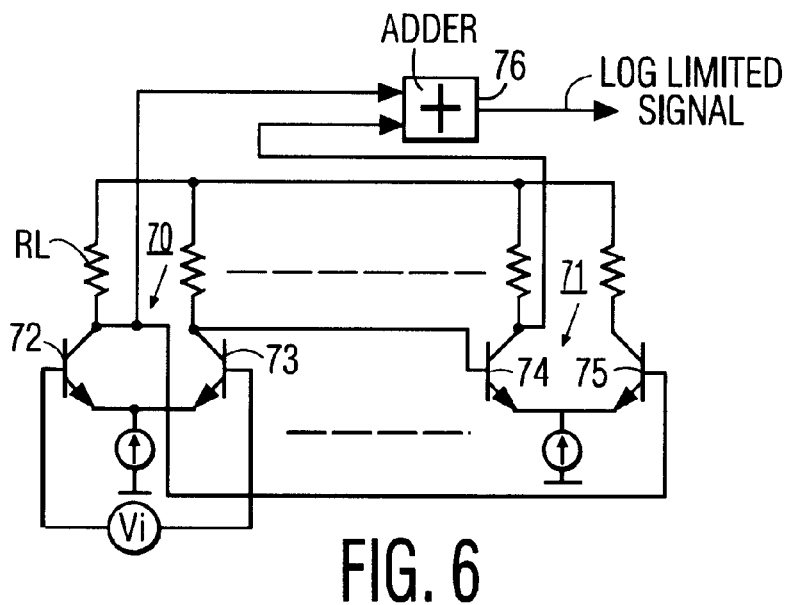
FIG. 6 shows a multistage limiter and adder.

FIG. 6 shows a multistage limiter and adder comprised of a cascade of differential amplifiers 70 and 71, further differential amplifier stages being indicated by a dashed line. The number of stages is six, for instance. The stage 70 comprises transistors 72 and 73 to which an input signal $V_i$ is supplied. Further shown is a load resistor RL. Similarly, the stage 71 comprises transistors 74 and 75. The signal $V_i$ is supplied to all stages. Through an adder 76, a log limited signal is formed from the amplified signals $V_i$.

In view of the foregoing it will be evident to a person skilled in the art that various modifications may be made within the spirit and scope of the invention as hereinafter defined by the appended claims and that the invention is thus not limited to the examples provided. The word "comprising" does not exclude the presence of other elements or steps than those listed in a claim.

What is claimed is:

1. A method of determining a received signal strength indicator signal from an in-phase signal component and a quadrature signal component of a low intermediate frequency signal that represents a received radio frequency signal, said method comprising:

determining a first absolute value from said in-phase signal component;

determining a second absolute value from said quadrature signal component;

logarithmically processing said in-phase and quadrature signal components; and summing said first and second absolute values;

wherein said logarithmically processing comprises multistage limiting of said in-phase and quadrature signal components, and summing said multistage limited in-phase and quadrature signal components.

2. A method as claimed in claim 1, wherein said logarithmically processing said in-phase and quadrature signal component is performed before determining said first and second absolute values.

3. A method as claimed in claim 1, wherein said logarithmically processing said in-phase and quadrature signal component is performed after summing said first and second absolute values.

4. A method as claimed in claim 1, wherein said received signal strength indicator signal is further determined by low pass filtering said summed first and second absolute values.

5. A method as claimed in claim 1, wherein said low intermediate frequency signal is a zero intermediate frequency signal.

6. A radio device comprising:

an antenna for receiving a radio frequency signal;

a quadrature down converter for producing a low intermediate frequency in-phase signal component and a low intermediate frequency quadrature signal component from said radio frequency signal;

a received signal strength indicator for producing a received signal strength indicator signal from said low intermediate frequency in-phase and quadrature signal components, said received signal strength indicator comprising a first absolute value former for deriving a first absolute signal from said in-phase signal component, a second absolute value former for deriving a second absolute signal from said quadrature signal component, and an adder for adding said first and second absolute signal, wherein said received signal strength indicator further comprises a first logarithmic signal former for determining a first logarithmic signal from said in-phase signal component and a second logarithmic signal former for determining a second logarithmic signal from said quadrature signal component, said first absolute signal being said first logarithmic signal and said second absolute signal being said second logarithmic signal; and wherein said first and second logarithmic signal formers comprise respective multistage limiters and respective adders for adding signals produced by said multistage limiters.

7. A radio device as claimed in claim 6, wherein said received signal strength indicator further comprises a low pass filter for low pass filtering said added first and second absolute signals.

8. A radio device as claimed in claim 6, wherein said low intermediate frequency signal is a zero intermediate frequency.

9. A received signal strength indicator for use in radio device with an antenna for receiving a radio frequency signal, a quadrature down converter for producing a low intermediate frequency in-phase signal component and a low intermediate frequency quadrature signal component from said radio frequency signal, and said received signal strength indicator for producing a received signal strength indicator signal from said low intermediate frequency in-phase and quadrature signal components, said received signal strength indicator comprising a first absolute value former for deriving a first absolute signal from said in-phase signal component;

a second absolute value former for deriving a second absolute signal from said quadrature signal component; and an adder for adding said first and second absolute signals;

wherein said received signal strength indicator further comprises a first logarithmic signal former for determining a first logarithmic signal from said in-phase signal component and a second logarithmic signal former for determining a second logarithmic signal from said quadrature signal component, said first absolute signal being said first logarithmic signal and said second absolute signal being said second logarithmic signal; and wherein said first and second logarithmic signal formers comprise respective multistage limiters and respective adders for adding signals produced by said multistage limiters.

10. The received signal strength indicator as claimed in claim 9, wherein said low intermediate frequency signal is a zero intermediate frequency signal.

11. The received signal strength indicator of claim 9, wherein the multi-stage limiters each comprise a cascade of differential amplifiers.

* * * * *